Oct. 31, 1972 G. W. CARR 3,701,562
CONTAINER CHASSIS ATTACHMENT ARRANGEMENT
Filed Nov. 6, 1969 3 Sheets-Sheet 1

INVENTOR
GEORGE W. CARR
BY Richard J. Myers
ATT'Y.

Oct. 31, 1972  G. W. CARR  3,701,562
CONTAINER CHASSIS ATTACHMENT ARRANGEMENT
Filed Nov. 6, 1969  3 Sheets-Sheet 2
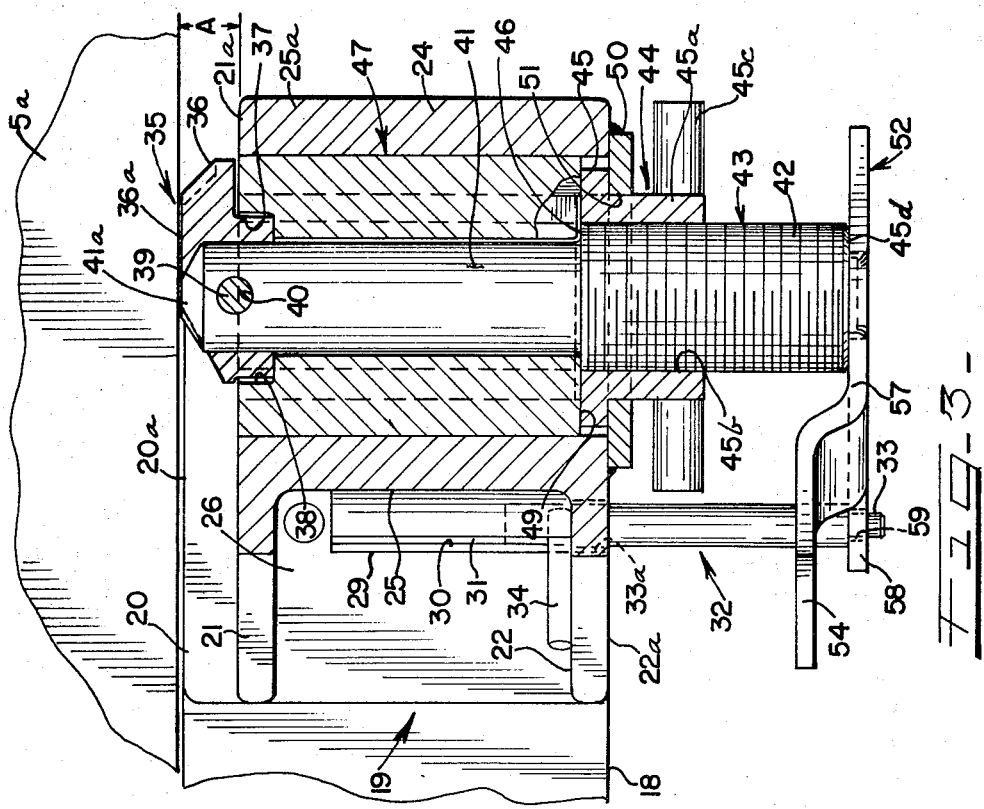
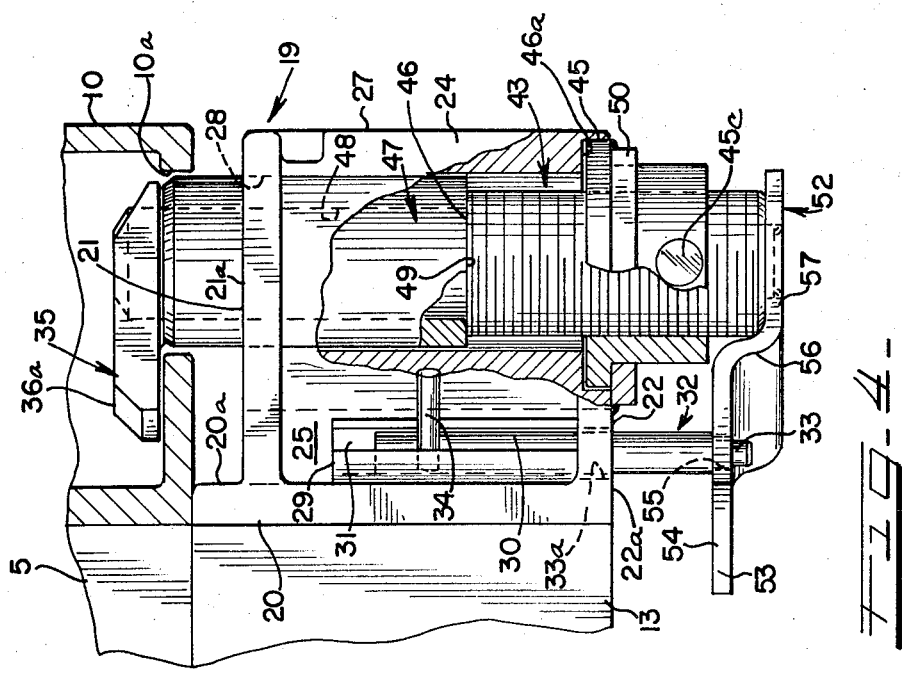
INVENTOR
GEORGE W. CARR
BY Richard J. Myers
ATT'Y.

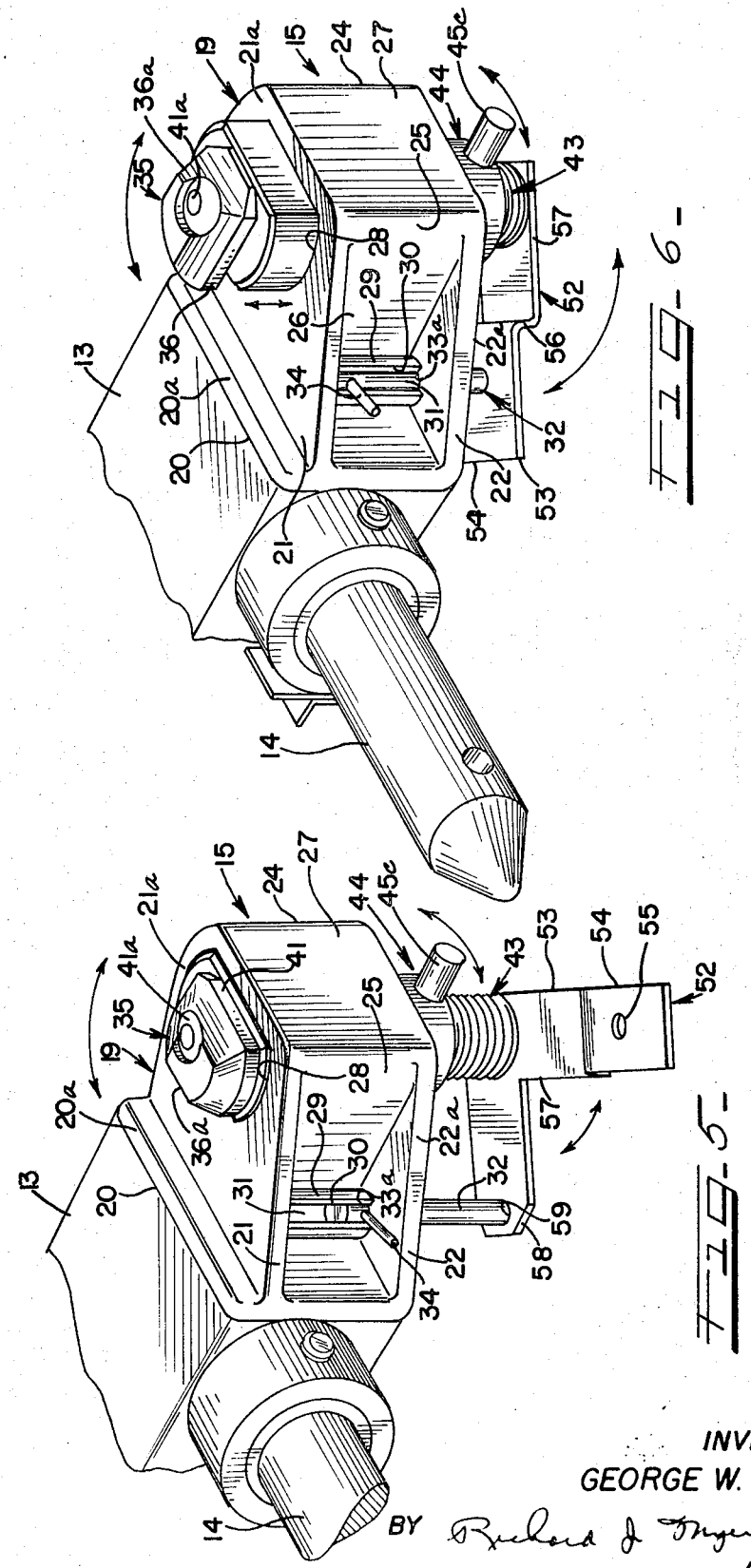

United States Patent Office 3,701,562
Patented Oct. 31, 1972

3,701,562
CONTAINER CHASSIS ATTACHMENT
ARRANGEMENT
George W. Carr, Cincinnati, Ohio, assignor to
Pullman Incorporated, Chicago, Ill.
Filed Nov. 6, 1969, Ser. No. 874,427
Int. Cl. B65j 1/22
U.S. Cl. 296—35 A    4 Claims

ABSTRACT OF THE DISCLOSURE

A trailer container chassis attachment arrangement for coupling one large container or two smaller containers to the chassis including twist lock means comprising a twist lock structure on the chassis at each corner casting connecting same to the chassis, each twist lock structure including a housing receiving a vertically retractable shear block reciprocally supported by a screw retained on the housing by nut means to elevate and lower the screw means with the shear block into the bottom of the corner casting, the top portion of the screw carrying a twist lock head rotatably positioned into locking position in the container, and lock means in the form of a vertically reciprocable plunger locking the screw against rotation in elevated and lowered locked and unlocked positions of the twist lock head and twist lock screw.

SUMMARY

The present invention relates to improved trailer structure and arrangement for tying either a pair of containers or one container on a pair of chassis whereby the chassis are coupled together. The trailer structure and arrangement includes a twist lock arrangement carried on the end cross beams of each of the chassis and each twist lock arrangement being adapted to tie each corner of the container or containers to the two chassis. Each twist lock unit comprises a vertically retractable screw element atop which is located a twist lock head. The screw element also locates in vertical positions a shear block carried by the screw element so that twisting movement of the nut carried by the twist lock housing elevates the twist lock head into the container corner casting and then the screw is held against rotation by a tie member or plunger and wherein release of the tie means or plunger permits the screw to rotate the twist lock head from unlocked to locked positions within the corner casting.

By such arrangement of the adjustable twist lock design for couplable trailer chassis, the tension forces of the containers are transferred into each of the shear blocks and into the trailer chassis. Vertical adjustment of the shear block and twist lock is thereby accommodated for different thicknesses of the bottom of the container corner castings. Also varying vertical locations of the container corner casting in relation to the bottom of the container are accommodated.

Further, by this arrangement a full sized single container or two one-half full size containers may be coupled to two chassis. Another advantage of this arrangement is that the container tie-down device or twist lock arrangement permits the twist lock head and the shear block means to be variably adjustable vertically and horizontally to allow the tie-down device to be fully retracted to accommodate container corner fittings of any thickness.

BRIEF DESCRIPTION OF THE DRAWINGS

FIG. 3 is a side elevational view, partly in section, of the container and twist lock arrangement in the lowered container unlocked position;

FIG. 4 is an end elevational view, partly in section, of the container and twist lock arrangement in the elevated container locked position;

FIG. 5 is a perspective view of the twist lock assembly in the lower or retracted container unlocked position; and FIG. 6 is a perspective view of the twist lock assembly in the elevated container locked position.

DETAILED DESCRIPTION

Figure 1:
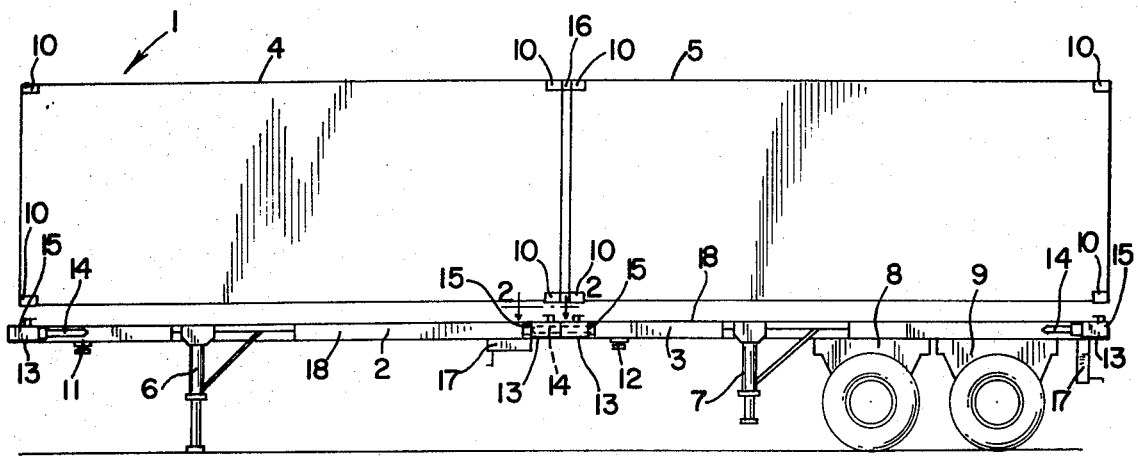
FIG. 1 is a side elevational view of the container-chassis arrangement employing the novel twist lock arrangement for coupling the chassis to the containers.
Figure 2:
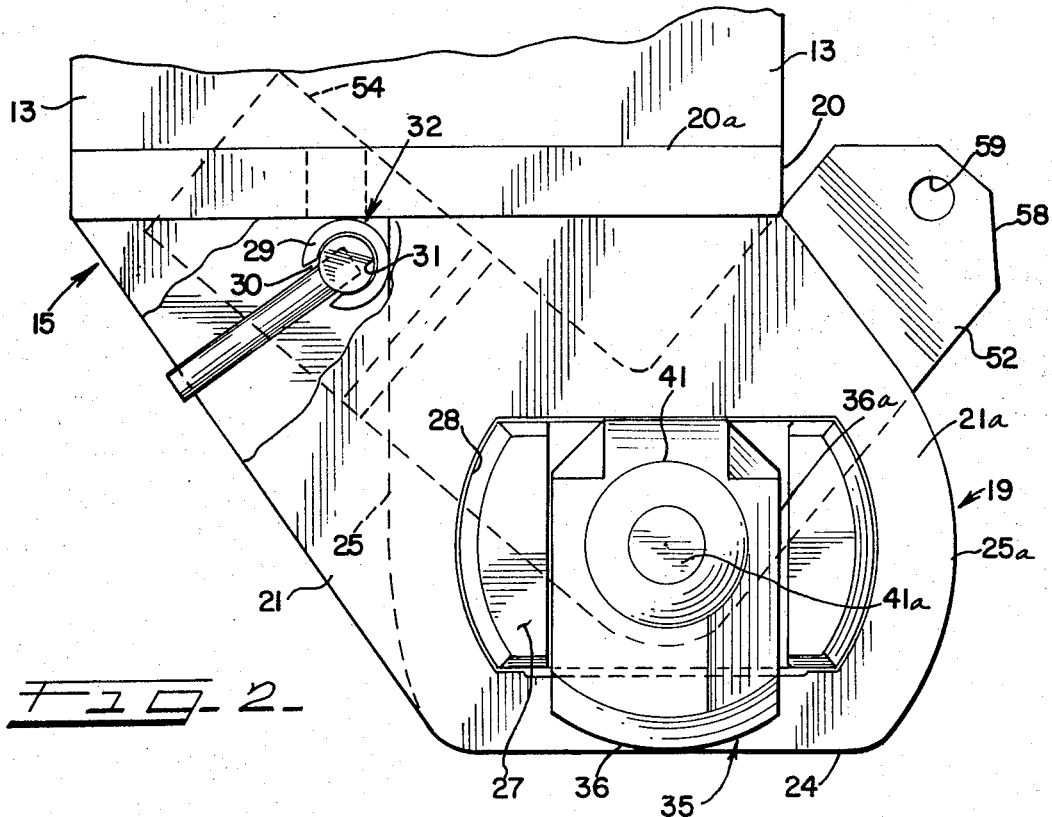
FIG. 2 is a partial top plan view of the twist lock arrangement.

With reference now to the drawings and in particular with reference to FIG. 1 there is shown a tailer 1 of the couplable together container-chassis type. The trailer 1 comprises a forward chassis or frame 2 and a rearward chassis or frame 3. The forward chassis carries thereon a forward container 4 of 20-foot length and the rearward chassis 3 carries thereon a rearward container 5 of 20-foot length. In FIG. 3 there is shown partially a double sized or 40-foot container for support on the two coupled together chassis.

The forward chassis has a forward down or extended foldable landing gear 6 and the rear chassis has an up or retracted foldable landing gear 7. The forward bogie 8 originally on the forward chassis 2 has been slid to the rear chassis 3 with the rear bogie 9 located at the rear end of the chassis 3. Each container 4 or 5 is provided with eight corner castings 10 at each of the container corners. Each corner casting 10 is provided with a bottom opening 10a. The general type of construction and arrangement of the bottom opening of the container corner casting is disclosed in U.S. Pat. 3,294,420 issued on Dec. 27, 1966 to J. J. Martin, said patent being herein incorporated by reference. The forward chassis has a king pin 11 and the rearward chassis has a king pin 12. Each chassis is provided with fore and aft end cross members 13. The two chassis 2 and 3 are held together by the coupling pins 14 attached to the outer ends of the respective ends of the cross members such that the trailer may be towed down the highway without any containers supported thereon or a container or containers may be supported thereon. By such a trailer design it is readily apparent that one large or two small containers may be carried on the two coupled together chassis with the forward chassis having its king pin 11 coupled to a truck and the rear chassis carrying both bogies 8 and 9. Each of the containers at their bottom corner castings or fittings are held to both frames 2 and 3 by novel twist lock structure or means 15. Top spacers 16 on each side of the trailer space upper facing corner castings of each container from one another. Each trailer frame is provided with a folding bumper 17 and a pair of side members 18.

A twist lock structure or means 15 is attached at each end of each outer end cross beam member such that each chassis is provided with four such twist lock means at each of its four corners. With reference to FIGS. 2–6 it is seen that each twist lock means 15 includes a twist lock casting or housing 19 which is generally rectangularly shaped except that one side is on a bias. The housing 19 has a housing back plate portion or upright cross-member engaging flange 20. Surface 21a can vary in its position in relation to the top of the chassis cross-member along flange 20 (see dimension "A"). It could become flush with the top of the chassis crossmember and serve as a support for the container casting. The casting has an upper horizontal web portion 21, one side of which is triangularly shaped and defines the housing top 21a of shear block and retractable screw housing block section 24 and has a lower web portion 22 which has its same side triangularly shaped to define the housing bottom 22a of shear block and retractable screw housing block section 24 which has a flat vertical end wall 25 and a curved end portion 25a and a side portion 27. The one end of the back plate 20 and the top web portion 21 and the bottom web portion 22 that extend away from the housing portion 24 define with the end wall 25 an opening or recess 26 in which recessed area 26 is stored the plunger 32.

The shear block portion 24 is provided with a shear block bore 28 which is generally rectangular in shape except that its ends are convex. The plunger or stop arm 32 is mounted in the plunger housing 29 deposed between the upper and lower web portions 21 and 22 and is provided with a plunger housing slot 30 for allowing the plunger handle 34 to move between the top and bottom web portions 21 and 22 for carrying the arm 32 in a reciprocating vertical movement. The plunger 32 is provided at its lower end with a reduced shaft portion 33 extending below the bottom web portion 22 through an opening 33a in the lower web portion 22. The shear block 47 is vertically reciprocally mounted within the bore 28 and has its outer periphery generally contoured to the inner periphery of the bore 28 to prevent rotation of the shear block about a vertical axis. The shear block 47 is provided with a shear block internal cylindrical bore 48 in which is mounted the screw stem or upper shaft portion 41 of the elevatable member or screw 43.

A twist lock head 35 is attached to the upper end of the stem 41 and includes an upper head portion 36a having a horizontally extending head projection 36 for engagement with the bottom inside wall of a corner casting or fitting. The twist lock head 35 is further provided with a lower cylindrical head portion 37 in the recess or cylindrical counterbore 38 of the shear block 47, the recess 38 being larger than and connecting with the internal bore 48. The twist lock head 35 is held fixed on the screw stem 41 by twist lock head attaching pin 39 (see FIG. 3) extending through pin hole 40 (FIG. 1) in the stem 41. The top of the stem 41 is tapered upwardly to form a shaft portion crown 41a. The screw 43 (see FIGS. 3 and 4) has a lower threaded shaft portion 42 to which is threadily attached the elevating nut 44. The elevating nut has a top flange or cylindrical head 45 of greater diameter than the nut shank 45a below it, the nut shank having a cylindrically threaded bore 45b threadily carrying the lower threaded shaft portion 42 of the screw 43. The nut 44 has a handle or screw turning arrangement 45c which causes the nut to rotate in the recess defined between the bottom 49 of the shear block 47 and the top of the support plate means or support plates 50, the screw and the nut being supported by the plates 50 which are attached by welding to the underside or housing bottom 22a. The threaded portion 42 of the screw has a greater diameter than the stem 41 to define a screw shoulder or abutment 46 (see FIG. 3) which supports and carries in reciprocating fashion the shear block 47. As seen in FIG. 4 the housing portion 24 is provided with an undercut or recessed portion 46a (see FIG. 4) which prevents upward travel of the nut 44 when the screw travels upward upon rotation of the nut handle 45c. The support plates 50 are welded to the housing and define a support plate bore 51 surrounding the nut shank in order to support the nut flange. The lower end of the threaded shaft portion 42 of the screw is provided with a handle 52 which is fixedly attached thereto at its bottom 45d and includes a locking arm 53 having a handle elevated end portion 54 with a hole 55 in it to receive the lower end 33 of the plunger or stop arm 32 and has an upright or vertical portion 56 and a lower horizontal portion 57 attached to the bottom 45d of the screw. The screw handle 52 is further provided with a locking handle arm 58 spaced 90° from the locking arm 53 and has a hole 59 in it for also selectively receiving shaft portion 33 of the plunger. The screw may be rotated in either direction (see arrow, FIGS. 5 and 6) so either hole 55 or 59 can alternately receive shaft end portion 33.

THE OPERATION

A single 20-foot container 4 or 5 may be placed on a single chassis 2 or 3 that is supported by a landing gear 7 and a bogie 8 or 9, as shown in FIG. 1, of a pair of 20-foot precoupled containers 4 and 5 may be placed on top of a pair of coupled together chassis 2 or 3, or a single large 40-foot container (see FIG. 3) may be mounted on the coupled together chassis 2 and 3. In all such instances each corner of a container is coupled to the chassis by the novel twist lock structure 15. It will be appreciated that the twist lock structures at the end cross members 13 adjacent one another are in the lower or retracted position for supporting the 40-foot container that spans both chassis 2 and 3 since the center portion of the 40-foot container is not provided with bottom openings for receiving any twist lock structures. At the time of lowering container on the chassis the twist locks are in the up unlocked position. The container is lowered and guided by the head 36 and the shear block 47. After lowering container on the chassis, first rotate the handle to lock position and engage the plunger 32 into the hole 55 of the screw handle 54 then rotate the nut handle 45c. The elevating nut being constrained against vertical movement within the shear block housing by plate 50 forces the screw structure 43 to be lowered carrying both the screw and the shear block 47 within the bottom opening 10a of the corner casing as seen in FIG. 4 until the twist lock head 35 will touch the top of the opening 10a. Each twist lock assembly thus locks the container or containers to the cross member of the frame as shown in FIG. 4. The handle arm 53 has an elevated portion 54 which terminates the plunger movement so that the protrusion portion 33 of the plunger will not extend below the surface 52. In this way, the tractor tire is protected from being damaged by the sharp end of 33, when the rig, in turning a corner brings tractor wheels into close proximity with surface 52. If tractor tire comes into contact with handle surface 52 it will not damage the tire as would the sharpness of the plunger protrusion 33. The twist lock head and shear block are thus conjunctively vertically positioned by the jack arrangement or combination nut and screw means to accommodate corner castings in different vertical positions on the container as well as corner castings of different thicknesses, the jack arrangement infinitely varying the position of the shear block and twist lock head as the jack arrangement is being rotated for horizontally positioning the twist lock head.

The foregoing description and drawings are given merely to explain and illustrate the invention and the invention is not to be limited thereto, since those skilled in the art who have the disclosure before them will be able to make modifications and variations therein without departing from the scope of the invention.

What is claimed is:

1. An over-the-highway trailer comprising:
    a pair of coupled together chassis adapted to receiving a container on each chassis or one double size container on both chassis, a plurality of twist lock means mounted on the chassis and adapted for locking of the chassis to the bottom inside of each of the corner fittings of the containers, each twist lock means comprising a housing fixed to a chassis, shaft means extending into the housing and having a locking head constrained for movement with the shaft means and projecting above the housing and a locking rotatable constraining handle mounted at the lower end of the shaft means and below the housing, shear block means carried on the shaft means and disposed within the housing and constraining against rotating movement by the housing, said shaft means having a jack portion and said locking head having a horizontally extended locking position, an elevating rotatable jack constrained within the lower portion of the housing against vertical movement and cooperative with the jack portion for elevating and lowering the locking portion and the upper portion of the shear block means into and out of the bottom of the corner fitting, the shear block means adapted to receive shear forces from the container, said handle having a pair of horizontally spaced apart arms for selectively positioning the locking portion in an unlocked position for removing the locking portion and the shear block means from the corner fitting and in a locking position with the locking portion tightly engaging the bottom inside of the corner fitting, and a stop arm vertically reciprocally mounted on the housing and adapted for engagement with one of the arms and vertically reciprocal with the shaft means for constraining the shaft means against rotating movement, one of the said arms having one end connected to the shaft means and the other end connected with the stop arm, the end connected with the stop arm being elevated above the end connected to the shaft means and adapted for clearance with the wheels of the trailer upon turning of the trailer.

2. In a trailer chassis for detachably coupling and carrying a container having corner fittings each provided with an open bottom slot, a twist lock arrangement for coupling a container to the chassis comprising:

upright members in the form of vertically elongated shafts for each corner fitting, each shaft having a shear force receiving member mounted thereon and a locking head mounted thereon above the shear member and elevating jack means mounted thereon below the shear member for vertically reciprocating the shaft and moving shear member and locking head into the corner fitting via its slot, a housing fixed on the chassis for each shaft and having a vertical opening receiving the shaft therethrough and the shear member being disposed within and constrained against rotating movement by the housing opening and said locking head extending above the housing and receivable into the slot in the unlocked position and constrained within the fitting in the locked position with the elevating jack means tightly drawing the locking head against the inside of the corner fitting, said jack means comprising a turning nut on the shaft within the lower portion of the housing and constrained by the housing against vertical movement with the shaft and a complementary threaded portion on the shaft below the shear member in the housing and driven by rotation of the nut for moving the shaft and shear member and the locking head from the raised position with the locking head within the corner fitting to the lowered position with the locking head withdrawn from the corner fitting, the lower portion of the housing having lower plate means being mounted on the underside of the housing and said housing having an internal upper undercut portion within the lower portion of the housing above the plate means defining a nut receiving space, said nut being constrained within said space against vertical movement by the plate means and the undercut portion, means for rotating the shaft for locking engagement of the locking head against the inside of the corner fitting and including a handle on the lower portion of the shaft outside and underneath the housing and being rotatable to one of two positions for constraining rotating movement of the shaft in the locked and unlocked positions of the locking head, and locking means on the outside of the housing being cooperative with the handle and constraining the shaft against rotation in an unlocked position with the locking head being removed from the corner fitting and in a locked position with the locking head being in locking engagement with the inside of the corner fitting.

3. In a trailer chassis for detachably coupling and carrying a container having corner fittings each provided with an open bottom slot, a twist lock arrangement for coupling a container to the chassis comprising:

upright members in the form of vertically elongated shafts for each corner fitting, each shaft having a shear force receiving member mounted thereon and a locking head mounted thereon above the shear member and elevating jack means mounted thereon below the shear member for vertically reciprocating the shaft and moving shear member and locking head into the corner fitting via its slot, a housing fixed on the chassis for each shaft and having a vertical opening receiving the shaft therethrough and the shear member being disposed within and constrained against rotating movement by the housing opening and said locking head extending above the housing and receivable into the slot in the unlocked position and constrained within the fitting in the locked position with the elevating jack means tightly drawing the locking head against the inside of the corner fitting, said jack means comprising a turning nut on the shaft within the lower portion of the housing and constrained by the housing against vertical movement with the shaft and a complementary threaded portion on the shaft below the shear member in the housing and driven by rotation of the nut for moving the shaft and shear member and the locking head from the raised position with the locking head within the corner fitting to the lowered position with the locking head withdrawn from the corner fitting, means for rotating the shaft for locking engagement of the locking head against the inside of the corner fitting and including a handle on the lower portion of the shaft outside and underneath the housing and being rotatable to one of two positions for constraining rotating movement of the shaft in the locked and unlocked positions of the locking head, and locking means on the outside of the housing being cooperative with the handle and constraining the shaft against rotation in an unlocked position with the locking head being removed from the corner fitting and in a locked position with the locking head being in locking engagement with the inside of the corner fitting, said locking means including a vertically reciprocal upright stop arm on the housing, said handle including a pair of horizontally spaced handle arms, one of said handle arms being above the other attendant to elevating the stop arm in one of two locking positions and indicating whether the handle is in the locked or unlocked position.

4. The invention according to claim 3, and said handle being of such a length and having a close spatial relation with the housing in locked and unlocked positions to prevent interference of the handle with other parts of the trailer and within required road clearance lines.

References Cited
UNITED STATES PATENTS

| | | | |
|---|---|---|---|
| 584,985 | 6/1897 | Carson | 74—528 X |
| 2,023,219 | 12/1935 | Reamer | 74—527 UX |
| 2,873,822 | 2/1959 | Sloan | 74—527 X |
| 3,027,025 | 3/1962 | Tantlinger | 296—35 AX |
| 3,111,341 | 11/1963 | Fujioka et al. | 296—35 A |
| 3,188,074 | 6/1965 | Revitz et al. | 74—528 X |
| 3,288,492 | 11/1966 | Stricker et al. | 280—415 |
| 3,438,671 | 4/1969 | Seng | 296—35 A |
| 3,486,787 | 12/1969 | Campbell | 296—35 A |
| 3,521,845 | 7/1970 | Sweda et al. | 248—119 |

BENJAMIN HERSH, Primary Examiner

L. J. PAPERNER, Assistant Examiner

U.S. Cl. X.R.

105—366 B, 366 C; 116—114; 248—361 R